(12) United States Patent
Jew et al.

(10) Patent No.: US 11,250,503 B1
(45) Date of Patent: Feb. 15, 2022

(54) USER INTERFACE FOR PRESENTING CAPITAL OFFERS

(71) Applicant: Square, Inc., San Francisco, CA (US)

(72) Inventors: Walter Jew, San Francisco, CA (US); Juan Ignacio Santa Cruz Masoni, San Francisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 15/855,802

(22) Filed: Dec. 27, 2017

(51) Int. Cl.
G06Q 40/02 (2012.01)
G06F 3/0484 (2022.01)
G06Q 20/20 (2012.01)

(52) U.S. Cl.
CPC ....... G06Q 40/025 (2013.01); G06F 3/04847 (2013.01); G06Q 20/202 (2013.01)

(58) Field of Classification Search
CPC ........ G06Q 40/02; G06Q 40/06; G06Q 20/10; G06Q 40/025; G06Q 40/00; G06Q 20/20; G06Q 20/28
See application file for complete search history.

(56) References Cited

U.S. PATENT DOCUMENTS

| | | |
|---|---|---|
| 6,941,281 B1 | 9/2005 | Johnson |
| 7,630,932 B2 * | 12/2009 | Danaher ................ G06Q 40/02 705/37 |
| 7,974,918 B1 | 7/2011 | Kunde et al. |
| 8,150,762 B1 | 4/2012 | Reed |
| 8,204,779 B1 | 6/2012 | Hughes et al. |
| 8,429,067 B1 | 4/2013 | Keller et al. |
| 9,183,480 B1 | 11/2015 | Quigley et al. |
| 9,727,912 B1 | 8/2017 | Poursartip et al. |
| 9,786,005 B1 | 10/2017 | Poursartip et al. |
| 9,805,338 B1 | 10/2017 | Ghosn et al. |
| 9,892,458 B1 | 2/2018 | Shearer et al. |

(Continued)

FOREIGN PATENT DOCUMENTS

WO WO-2008150243 A2 * 12/2008 ............. G06Q 40/06

OTHER PUBLICATIONS

Final Office Action dated Jan. 11, 2019, for U.S. Appl. No. 16/024,140, of Masoni, J.I.S.C., et al., filed Jun. 29, 2018.

(Continued)

*Primary Examiner* — Florian M Zeender
*Assistant Examiner* — Milena Racic
(74) *Attorney, Agent, or Firm* — Mattingly & Malur, PC

(57) ABSTRACT

A user interface (UI) for presenting capital offers associated with different loan products is described. A service provider can analyze potential borrower data to generate custom capital offers for the potential borrower. A first set of the custom capital offers can be associated with a first loan product and a second set of the custom capital offers associated with a second loan product having different repayment terms than the first loan product. The service provider can receive an indication of interest associated with a capital loan product and, responsive to receiving the indication of interest, can cause a UI to be presented via a display of a device operated by the potential borrower. The UI can include a slider that allows the potential borrower to transition between offers associated with the first loan product and the second loan product to select a custom capital offer of the custom capital offers.

20 Claims, 7 Drawing Sheets

(56) References Cited

U.S. PATENT DOCUMENTS

| | | | |
|---|---|---|---|
| 9,984,412 B1 | 5/2018 | Poursartip et al. | |
| 10,007,953 B1 | 6/2018 | Nathoo et al. | |
| 10,019,698 B1 | 7/2018 | Scott et al. | |
| 10,373,185 B1 | 8/2019 | Spitzer | |
| 10,445,716 B1 | 10/2019 | Riechers et al. | |
| 10,453,086 B1 | 10/2019 | Scott et al. | |
| 10,535,054 B1 | 1/2020 | Sptizer | |
| 10,628,816 B1 | 4/2020 | Scott et al. | |
| 10,692,140 B1 | 6/2020 | Kim et al. | |
| 2001/0044756 A1 | 11/2001 | Watkins et al. | |
| 2003/0074311 A1 | 4/2003 | Saylors et al. | |
| 2003/0163447 A1 | 8/2003 | Sandman | |
| 2004/0111361 A1 | 6/2004 | Griffiths et al. | |
| 2004/0225545 A1 | 11/2004 | Turner et al. | |
| 2004/0225594 A1 | 11/2004 | Nolan, III et al. | |
| 2005/0131843 A1 | 6/2005 | Sansone et al. | |
| 2005/0192862 A1 | 9/2005 | Modi | |
| 2005/0239448 A1 | 10/2005 | Bayne | |
| 2006/0015469 A1 | 1/2006 | Whitehouse | |
| 2006/0242030 A1 | 10/2006 | Blanchard, Jr. et al. | |
| 2007/0067208 A1 | 3/2007 | Haggerty et al. | |
| 2007/0150387 A1 | 6/2007 | Seubert et al. | |
| 2007/0271178 A1 | 11/2007 | Davis et al. | |
| 2007/0288357 A1* | 12/2007 | Holman | G06Q 40/02 705/38 |
| 2008/0052229 A1 | 2/2008 | Sheinker et al. | |
| 2008/0228540 A1 | 9/2008 | Megdal et al. | |
| 2008/0243569 A1* | 10/2008 | Hadden | G06Q 20/10 705/38 |
| 2009/0222374 A1 | 9/2009 | Choudhuri et al. | |
| 2009/0222378 A1 | 9/2009 | Choudhuri et al. | |
| 2009/0313156 A1 | 12/2009 | Herr | |
| 2010/0049588 A1 | 2/2010 | Debow | |
| 2010/0100464 A1 | 4/2010 | Ellis et al. | |
| 2010/0114624 A1 | 5/2010 | Lakshminarayan et al. | |
| 2010/0228651 A1 | 9/2010 | Becerra et al. | |
| 2011/0078073 A1 | 3/2011 | Annappindi | |
| 2011/0112923 A1 | 5/2011 | Chatter et al. | |
| 2011/0178902 A1* | 7/2011 | Imrey | G06Q 20/027 705/30 |
| 2011/0251870 A1 | 10/2011 | Tavares et al. | |
| 2011/0302018 A1 | 12/2011 | Norcross et al. | |
| 2012/0005036 A1 | 1/2012 | Erickson | |
| 2012/0054097 A1 | 3/2012 | Frohwein et al. | |
| 2012/0089436 A1 | 4/2012 | Tavares et al. | |
| 2012/0109820 A1* | 5/2012 | Galit | G06Q 20/105 705/41 |
| 2012/0185311 A1 | 7/2012 | Tavares et al. | |
| 2012/0232974 A1 | 9/2012 | Castiglione | |
| 2012/0233090 A1 | 9/2012 | Tavares et al. | |
| 2012/0239552 A1 | 9/2012 | Harychi | |
| 2012/0310686 A1 | 12/2012 | Carter | |
| 2012/0330741 A1 | 12/2012 | Cruz | |
| 2012/0330769 A1 | 12/2012 | Arceo | |
| 2013/0013477 A1 | 1/2013 | Ortega | |
| 2013/0110607 A1 | 5/2013 | Basmajian et al. | |
| 2013/0268342 A1 | 10/2013 | Tune et al. | |
| 2013/0305356 A1 | 11/2013 | Cohen-Ganor et al. | |
| 2013/0339219 A1* | 12/2013 | Bernheimer | G06Q 40/02 705/38 |
| 2014/0006202 A1 | 1/2014 | Frohwein et al. | |
| 2014/0012780 A1 | 1/2014 | Sanders | |
| 2014/0122195 A1 | 5/2014 | Tabor et al. | |
| 2014/0172560 A1 | 6/2014 | Satyavolu et al. | |
| 2014/0180826 A1 | 6/2014 | Boal | |
| 2014/0229397 A1 | 8/2014 | Fink | |
| 2014/0258088 A1* | 9/2014 | Belarj | G06Q 40/025 705/38 |
| 2014/0351116 A1 | 11/2014 | Hoff | |
| 2014/0358766 A1* | 12/2014 | Nayyar | G06Q 40/025 705/38 |
| 2015/0026035 A1 | 1/2015 | Showalter | |
| 2015/0039490 A1 | 2/2015 | Forester et al. | |
| 2015/0066635 A1 | 3/2015 | Valin et al. | |
| 2015/0100475 A1 | 4/2015 | Cummings et al. | |
| 2015/0106260 A1 | 4/2015 | Andrews et al. | |
| 2015/0149333 A1 | 5/2015 | Yaplee et al. | |
| 2015/0180833 A1 | 6/2015 | Snow et al. | |
| 2015/0348083 A1 | 12/2015 | Brill et al. | |
| 2015/0371335 A1 | 12/2015 | Liptak et al. | |
| 2016/0012465 A1 | 1/2016 | Sharp | |
| 2016/0086222 A1 | 3/2016 | Kurapati | |
| 2016/0189292 A1 | 6/2016 | Deshpande et al. | |
| 2017/0098216 A1 | 4/2017 | Studnitzer | |
| 2017/0193596 A1 | 7/2017 | Bol et al. | |
| 2017/0255793 A1 | 9/2017 | Caldwell | |
| 2018/0040064 A1 | 2/2018 | Grigg et al. | |
| 2018/0053253 A1* | 2/2018 | Gokhale | G06Q 40/025 |
| 2018/0150910 A1 | 5/2018 | Grech et al. | |
| 2018/0158091 A1 | 6/2018 | Ovick et al. | |
| 2018/0204280 A1 | 7/2018 | Painter et al. | |
| 2018/0225648 A1 | 8/2018 | Robinson et al. | |
| 2018/0349990 A1 | 12/2018 | Diriye et al. | |
| 2019/0172155 A1 | 6/2019 | Byron et al. | |
| 2020/0387923 A1 | 12/2020 | Mitchell | |

OTHER PUBLICATIONS

Notice of Allowance dated Mar. 22, 2019, for U.S. Appl. No. 14/985,191, of Spitzer, G., filed Dec. 30, 2015.

"MCM Poll Results: 72 percent of Mobile Food Vendor only accept cash," Mobile Cuisine Magazine, accessed at http://web.archive.org/web/201104 23204019/mobile-cuisine.com/features/mcm-poll-results-72-percent-of-mobile-food-vendors-only-accept -cash/, p. 2 (Jan. 25, 2011).

Non-Final Office Action dated Sep. 4, 2018, for U.S. Appl. No. 16/024,140, of Masoni, J.I.S.C, et al., filed Jun. 29, 2018.

Non-Final Office Action dated Sep. 27, 2018, for U.S. Appl. No. 14/985,191, of Spitzer et al., filed Dec. 30, 2015.

Non-Final Office Action dated Dec. 13, 2019, for U.S. Appl. No. 16/517,374, of Daya, R., et al., filed Jul. 19, 2019.

Notice of Allowance dated Dec. 23, 2019, for U.S. Appl. No. 15/911,221, of Scott, J.B., et al., filed Mar. 5, 2018.

Final Office Action dated Jan. 17, 2020, for U.S. Appl. No. 16/024,140, of Masoni, J.I.S.C., et al., filed Jun. 29, 2018.

Final Office Action dated Feb. 4, 2020, for U.S. Appl. No. 16/024,167, of Masoni, J.I.S.C., et al., filed Jun. 29, 2018.

Non-Final Office Action dated Aug. 7, 2019, for U.S. Appl. No. 16/024,140, of Masoni, J I.S.C., et al., filed Jun. 29, 2018.

Non-Final Office Action dated Aug. 22, 2019, for U.S. Appl. No. 15/911,221, of Scott, J.B , et al., filed Mar. 5, 2018.

Non-Final Office Action dated Aug. 30, 2019, for U.S. Appl. No. 16/024,167, of Masoni, J.I.S.C., et al., filed Jun. 29, 2018.

Final Office Action dated Mar. 6, 2020, for U.S. Appl. No. 16/517,374, of Daya, R., et al., filed Jul. 19, 2019.

Advisory Action dated Apr. 3, 2020, for U.S. Appl. No. 16/024,140, of Masoni, J.I.S.C., et al., filed Jun. 29, 2018.

Advisory Action dated Apr. 9, 2020, for U.S. Appl. No. 16/024,167, of Masoni, J.I.S.C., et al., filed Jun. 29, 2018.

Non-Final Office Action dated May 15, 2020, U.S. Appl. No. 15/995,039, of Perelli-Minetti, L., et al., filed May 31, 2018.

Non-Final Office Action dated Jun. 25, 2020, U.S. Appl. No. 15/994,882, of Kerof, V., et al., filed May 31, 2018.

Non-Final Office Action dated Jul. 23, 2020, for U.S. Appl. No. 16/024,140, of Masoni, J.I.S.C., et al., filed Jun. 29, 2018.

Non-Final Office Action dated Aug. 20, 2020, for U.S. Appl. No. 16/022,397, of Bekmann, J., et al., filed Jun. 28, 2018.

Advisory Action dated Feb. 18, 2021, U.S. Appl. No. 15/995,039, of Perelli-Minetti, L., et al., filed May 31, 2018.

Advisory Action dated May 25, 2021, for U.S. Appl. No. 16/022,397, of Bekmann, J., et al., filed Jun. 28, 2018.

"Report Information from Dialog", Dialog (Jul. 3, 2021), pp. 1-30.

Notice of Allowance dated Jul. 13, 2021, for U.S. Appl. No. 16/022,397, of Bekmann, J., et al., filed Jun. 28, 2018.

Non-Final Office Action dated Aug. 12, 2021, U.S. Appl. No. 15/995,039, of Perelli-Minetti, L., et al., filed May 31, 2018.

Final Office Action dated Mar. 26, 2021, for U.S. Appl. No. 16/022,397, of Bekmann, J., et al., filed Jun. 28, 2018.

(56) References Cited

OTHER PUBLICATIONS

Notice of Allowance dated Apr. 15, 2021, U.S. Appl. No. 15/994,882, of Kerof, V., et al., filed May 31, 2018.
Final Office Action dated Jan. 6, 2021, U.S. Appl. No. 15/994,882, of Kerof, V., et al., filed May 31, 2018.
Supplemental Notice of Allowability dated Sep. 9, 2021, for U.S. Appl. No. 16/022,397, of Bekmann, J., et al., filed Jun. 28, 2018.

* cited by examiner

400

402 DETERMINE, BASED AT LEAST IN PART ON MERCHANT DATA ASSOCIATED WITH A MERCHANT, A RANGE OF FUNDS AVAILABLE FOR THE MERCHANT VIA A CAPITAL LOAN PRODUCT

404 DETERMINE, BASED AT LEAST IN PART ON THE MERCHANT DATA, INCREMENTS WITHIN THE RANGE OF FUNDS, EACH INCREMENT CORRESPONDING TO AN INDIVIDUAL CUSTOM CAPITAL OFFER

406 DETERMINE, BASED AT LEAST IN PART ON THE MERCHANT DATA, A BREAK POINT WHEREIN INDIVIDUAL CUSTOM CAPITAL OFFERS TRANSITION FROM A FIRST LOAN PRODUCT TO A SECOND LOAN PRODUCT

408 ASSOCIATE EACH CUSTOM CAPITAL OFFER WITH A REGION OF A TRACKBAR OF A SLIDER

410 PRESENT, VIA A DEVICE OPERATED BY THE MERCHANT, THE SLIDER VIA A USER INTERFACE THAT ALLOWS THE MERCHANT TO TRANSITION BETWEEN CUSTOM CAPITAL OFFERS ASSOCIATED WITH DIFFERENT LOAN PRODUCTS BY CHANGING A POSITION OF A CONTROL OF THE SLIDER RELATIVE TO THE TRACKBAR

FIG. 4

USER INTERFACE FOR PRESENTING CAPITAL OFFERS

BACKGROUND

Numerous state and federal regulations heavily regulate advertisements and/or solicitations for capital loan products. Such regulations require lenders to provide a significant amount of information to potential borrowers. For instance, such regulations require lenders to provide terms of repayment, processing fees, etc. Due to the limited amount of presentation space available via displays of devices (e.g., phones, tablets, computers, etc.), surfacing the required amount of information to potential borrowers results in cluttered user interfaces that are difficult to read. Due to the inefficient presentation of such requisite information, many potential borrowers erroneously interact with such user interfaces and, as a result, unintentionally and/or erroneously enter loan agreements.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

FIG. 4 illustrates an example process for generating and presenting a user interface that includes a slider to enable a potential borrower to view information associated with different loan products utilizing the slider according to some implementations.

DETAILED DESCRIPTION

Figure 1:
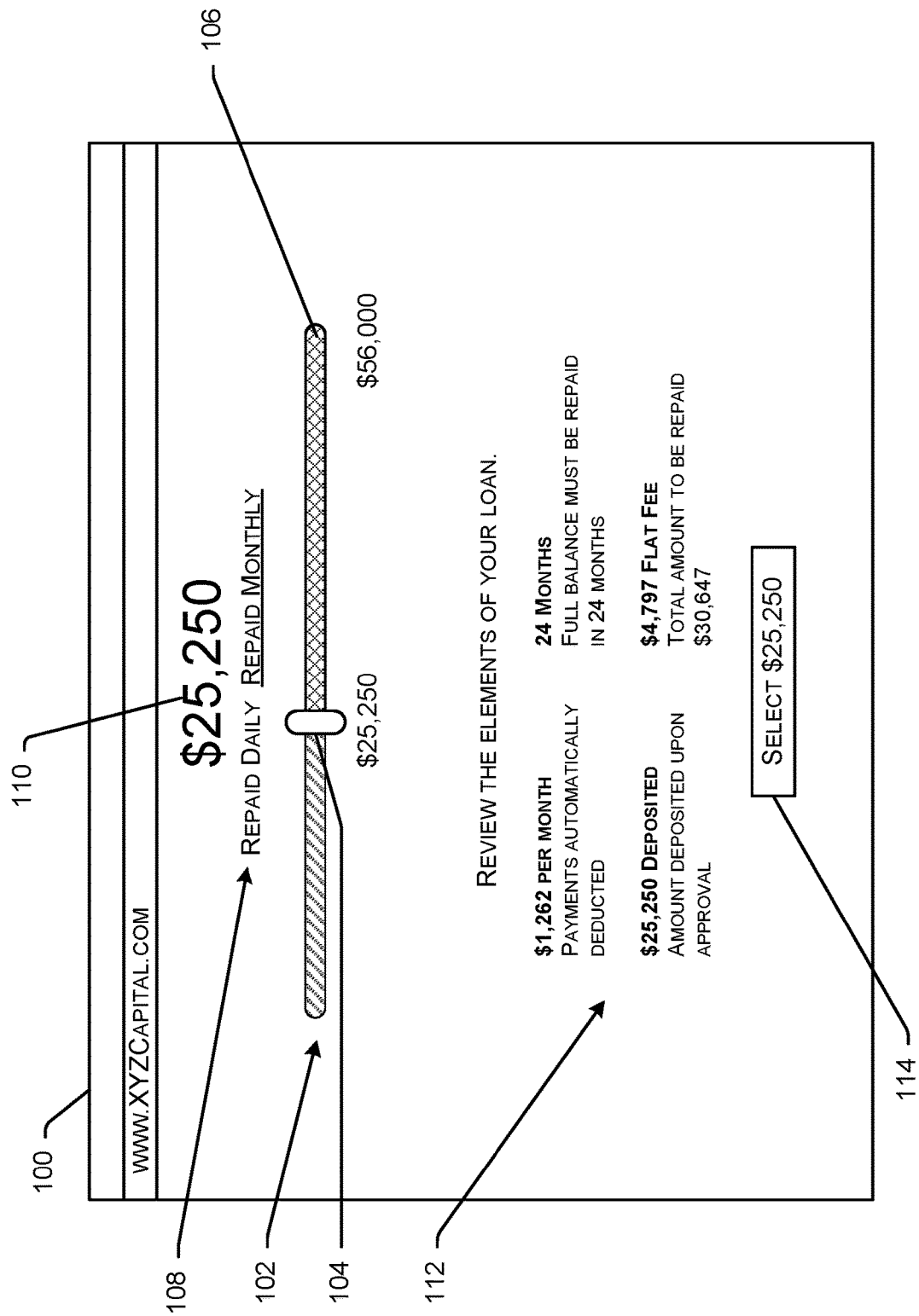
FIG. 1 illustrates an example user interface for enabling a potential borrower to view information associated with different loan products utilizing a slider.

Techniques described herein are directed to generating and/or presenting user interfaces that surface information associated with capital offers that are associated with different loan products. For the purpose of this discussion, a capital loan product is a product that facilitates the offering and/or lending of a loan to a borrower that is to be used for, in some instances, financing the borrower's short-term operational needs. For instance, a potential borrower that is a merchant can obtain a capital loan via a capital loan product in order to finance various operational costs (e.g., rent, payroll, inventory, etc.).

In at least one example, a payment processing service can offer a capital loan product in addition to other products to assist potential borrowers with their operational needs. For instance, a payment processing service can offer a capital loan product in addition to a product for tracking inventory, a product for processing payments, a product for managing employees, a product for managing payroll, etc. In at least one example, the payment processing service can offer different types of loan products within the capital loan product. For instance, in at least one example, the payment processing service can offer a daily repayment loan product, wherein a capital loan is repaid daily, for instance, from a portion of transactions processed by the payment processing service on behalf of the borrower. Of course, daily repayment can be provided via an alternative source (e.g., a borrower's bank account, etc.) as well. Additionally and/or alternatively, the payment processing service can offer a monthly repayment loan product, wherein a capital loan is repaid monthly, for instance, via a debit from a bank account linked to the payment processing service. Of course, monthly repayment can be provided via an alternative source (e.g., an unlinked bank account, etc.) as well. One or more additional and/or alternative loan products can be associated with the capital loan product.

As described above, numerous state and federal regulations heavily regulate advertisements and/or solicitations for capital loan products. Such regulations require lenders to provide a significant amount of information to potential borrowers. For instance, such regulations require lenders to provide terms of repayment, processing fees, etc. Due to the limited amount of presentation space available via displays of devices (e.g., phones, tablets, computers, etc.), surfacing the required amount of information to potential borrowers results in cluttered user interfaces that are difficult to read. This problem is compounded when multiple loan products are available.

Techniques described herein are directed to an improved user interface that enables potential borrowers to view information associated with different loan products utilizing a slider. For the purpose of this discussion, a slider is a user interface element that enables a user (e.g., a potential borrower) to select a numeric value from a predetermined range of values. In at least one example, a slider can include a control and a trackbar. Different regions of the trackbar can be associated with different values and the control can move between the different regions to enable selection of a value corresponding to a particular region. That is, the control can slide along the length of the trackbar to enable a user to select a particular value.

As described herein, the slider can be associated with a plurality of custom capital offers for a potential borrower. That is, various regions of the trackbar can be associated with particular custom capital offers. A user (e.g., a potential borrower) can slide the control along the length of the trackbar to view different custom capital offers (and associated terms of such custom capital offers) and select a particular custom capital offer. In at least one example, the plurality of custom capital offers can be associated with different loan products. For instance, at least a first set of the custom capital offers can be associated with a daily repayment loan product and a second set of the custom capital offers can be associated with a monthly repayment loan product. As the user slides the control along the length of the trackbar, terms (e.g., a total amount to be repaid, repayment method, an amount to be repaid per repayment period, a total amount of funds to be loaned to the user (e.g., deposit amount), a term length (e.g., when complete repayment is due), processing fees, etc.) relevant to a custom capital offer corresponding to the region of the trackbar proximate to the control can be surfaced to the user. As a result, the user can evaluate various custom capital offers, which can be associated with one or more loan products, and the terms associated with respective custom capital offers, and can accept a particular custom capital offer that the user deems most appropriate. Based on accepting the particular custom capital offer, techniques described herein can facilitate processing and funding a loan corresponding to the particular custom capital offer.

In at least one example, each user interface generated and/or presented via techniques described herein can be customized for a particular user. That is, each of the custom capital offers presented via a user interface can be customized for a particular user such that two potential borrowers can be presented with user interfaces that present different capital offers that are particular to them. As a user advances the control along the length of the trackbar, the user can be presented with capital offers that are specific to the user. That is, the user interface described herein can be unique in the number of custom capital offers that are presented to a user, the number of custom capital offers associated with a first loan product and the number of custom capital offers associated with a second loan product, and how such custom capital offers are presented along the length of the trackbar of the slider. As such, as a user advances to each offer (e.g., via interaction with the control of the slider), each region of the trackbar is customized for a particular user, and the user is presented with a user-specific capital offer.

Techniques described herein offer various improvements to existing user interfaces that surface the same and/or similar required information. As described above, existing user interfaces present required information in a cluttered manner that is unfriendly to users. Due to the inefficient presentation of such requisite information, many potential borrowers unintentionally and/or erroneously enter loan agreements. As described above, when more than one loan product is introduced—which necessitates the presentation of different terms—existing user interfaces are unable to clearly distinguish between different loan products. Accordingly, existing user interfaces are not user-friendly, thereby causing poor user interaction performance and a significant error rate.

Techniques described herein enable improved user efficiency by presenting a user interface that includes a slider to enable potential borrowers to browse a plurality of custom capital offers, which can be associated with more than one loan product. Accordingly, techniques described herein enable increased interaction performance and/or reduce the error rate at which potential borrowers unintentionally and/or erroneously enter loan agreements. By increasing interaction performance and/or reducing the error rate at which potential borrowers unintentionally and/or erroneously enter loan agreements, techniques described herein can reduce computational resources expended due to unintentional and/or erroneous interactions, thereby improving functioning of computing systems that surface capital offers to potential borrowers.

FIG. 1 illustrates an example user interface 100 for enabling a potential borrower to view information associated with different loan products utilizing a slider. In at least one example, such a user interface 100 can be presented via a display of a device. In some examples, the device can be a user device (e.g., phone, tablet, computer, etc.), which can be operated by a potential borrower. In additional and/or alternative examples, the device can be a point-of-sale (POS) device, which can be operated by a potential borrower, such as a merchant.

In at least one example, the user interface 100 can include a slider 102, which can be a user interface element that enables a potential borrower to select a custom capital offer from a plurality of predetermined custom capital offers. The slider 102 can include a control 104 that can be moved along a length of a trackbar 106. In at least one example, the trackbar 106 can be associated with multiple regions and each region can be associated with a particular custom capital offer. Accordingly, the potential borrower can slide the control 104 along the trackbar 106 to view different custom capital offers. In at least one example, one or more text indicators can be associated with the trackbar 106 to indicate an amount of the custom capital offer corresponding to the position of the control 104 (e.g., $25,250) and/or an available range of the custom capital offers represented by the trackbar 106 (e.g., up to $56,000).

In some examples, the custom capital offers associated with the trackbar 106 can be associated with more than one type of loan product. As described above, in at least one example, some of the custom capital offers can be associated with a daily repayment loan product and other of the custom capital offers can be associated with a monthly repayment loan product. In such an example, the user interface 100 can include text element(s) 108 that indicate the different types of loan products that are associated with the custom capital offers. For instance, text element(s) 108 identify two loan products: a first loan product associated with daily repayment ("repaid daily") and a second loan product associated with monthly repayment ("repaid monthly"). In some examples, a visual indicator can be used to identify which loan product applies to the current custom capital offer (as determined by the position of the control 104), as illustrated in FIG. 1.

In at least one example, the trackbar 106 can include one or more indicators to visually differentiate between the different loan products. As illustrated in FIG. 1, the left side of the trackbar 106 has a first shading and the right side of the trackbar 106 has a second shading. The first shading can visually indicate that custom capital offers associated with the left side of the trackbar 106 are associated with a first loan product and the second shading can visually indicate that the custom capital offers associated with the right side of the trackbar 106 are associated with a second loan product. In at least one example, the position of the text element(s) 108 identifying the two loan products and the visual differentiation between the two loan products can be useful for potential borrowers to differentiate between the two loan products, especially on devices with limited display space (e.g., phones).

As described above, the potential borrower can move the control 104 along the length of the trackbar 106. The position of the control 104 relative to the trackbar 106 can correspond to a particular custom capital offer. That is, in at least one example, the control 104 can be proximate to a region of the trackbar 106 that is associated with a particular custom capital offer. In at least one example, the user interface 100 can surface an amount associated with the particular custom capital offer via a text element 110. As illustrated in FIG. 1, the amount of $25,250 is presented as the text element 110, which indicates an amount associated with the custom capital offer that corresponds to the position of the control 104. Additional and/or alternative text element(s) that indicate an amount associated with a particular custom capital offer can be surfaced within a threshold distance of a region of the trackbar 106 that corresponds to the custom capital offer. For instance, in FIG. 1, the amount of $25,250 is presented within a threshold distance of the region of the trackbar 106 that corresponds to a custom capital offer for $25,250 (which happens to be where the control 104 is also positioned) and the amount of $56,000 is presented within a threshold distance of the region of the trackbar 106 that corresponds to a custom capital offer of $56,000.

In at least one example, as the potential borrower moves the control 104 along the length of the trackbar 106, one or more terms associated with each of the custom capital offers can be surfaced to the potential borrower, as illustrated by text element(s) 112. The term(s) can include a total amount to be repaid (e.g., $30,647), a repayment method, an amount to be repaid per repayment period (e.g., $1,262), a total amount of funds to be loaned to the user (e.g., $25,250), a term length (e.g., when complete repayment is due (e.g., 24 months)), processing fees (e.g., $4,797 flat fee), etc. In at least one example, the term(s) surfaced via the text element(s) 112 can be associated with information required to be presented to a potential borrower per state and/or federal regulations.

As described above, as the potential borrower moves the control 104 along the trackbar 106, one or more terms associated with each of the custom capital offers can be surfaced to the potential borrower, as illustrated by text element(s) 112. For instance, when the control 104 is in a first region of the trackbar 106, one or more first terms associated with the corresponding custom capital offer can be surfaced to the potential borrower, and when the control is in a second region of the trackbar 106, one or more second terms associated with the corresponding custom capital offer can be surfaced to the potential borrower. One or more transitions can be used to update the term(s) as the control 104 is moved along the length of the trackbar 106. In some examples, the term(s) presented via the text element(s) 112 can be updated by a dissolve transition, a scroll transition, etc., where one or more second terms replace one or more first terms. In at least one example, the type of transition can be dependent on whether two custom capital offers are associated with a same loan product.

In at least one example, the user interface 100 can include a mechanism 114, the actuation of which indicates that the potential borrower accepts a particular custom capital offer. The mechanism 114 can be a graphical control element, control, widget, etc. In at least one example, the mechanism 114 can include a text element that corresponds to the particular custom capital offer associated with the position of the control 104 relative to the trackbar 106. Based at least in part on the potential borrower actuating the mechanism 114, the payment processing service can initiate loan processing for a loan corresponding to the capital offer selected by the potential borrower (e.g., determined per the position of the control 104 relative to the trackbar 106). As described herein, responsive to the potential borrower actuating the mechanism 114, the payment processing service can initiate processing the loan. That is, the payment processing service can send one or more requests for information to process the loan. In at least one example, the payment processing service can send a request for an affirmation that the potential borrower agrees to the terms of the loan (e.g., in addition to actuating the mechanism associated with the capital offer on the user interface). Responsive to receiving an affirmation that the potential borrower agrees to the terms of the loan, the payment processing service can send an instruction to transfer an amount of funds corresponding to at least a portion of the loan to an account of the potential borrower. In at least one example, the amount of funds can be transferred from an account of the payment processing service to an account of the potential borrower via an electronic funds transfer and/or other near-real time transfer.

In at least one example, the payment processing service can initiate loan processing and facilitate the transfer of funds without input (or with minimal input) from the potential borrower. That is, rather than the potential borrower filling out loan processing paper work, reading additional disclosure forms, and waiting for funds to go into their account, techniques described herein can expedite loan processing via the slider user interface and selection mechanism that enables the potential borrower to select a capital loan product.

It should be noted that the user interface 100 is but one example of a user interface that can be used to present information to potential borrowers via a display. Of course, other configurations and designs can be used to present information associated with capital offers. Furthermore, while FIG. 1, and this disclosure, is described in the context of capital offers, in additional and/or alternative examples, techniques described herein can be applicable to other type of loan offers.

Figure 2:
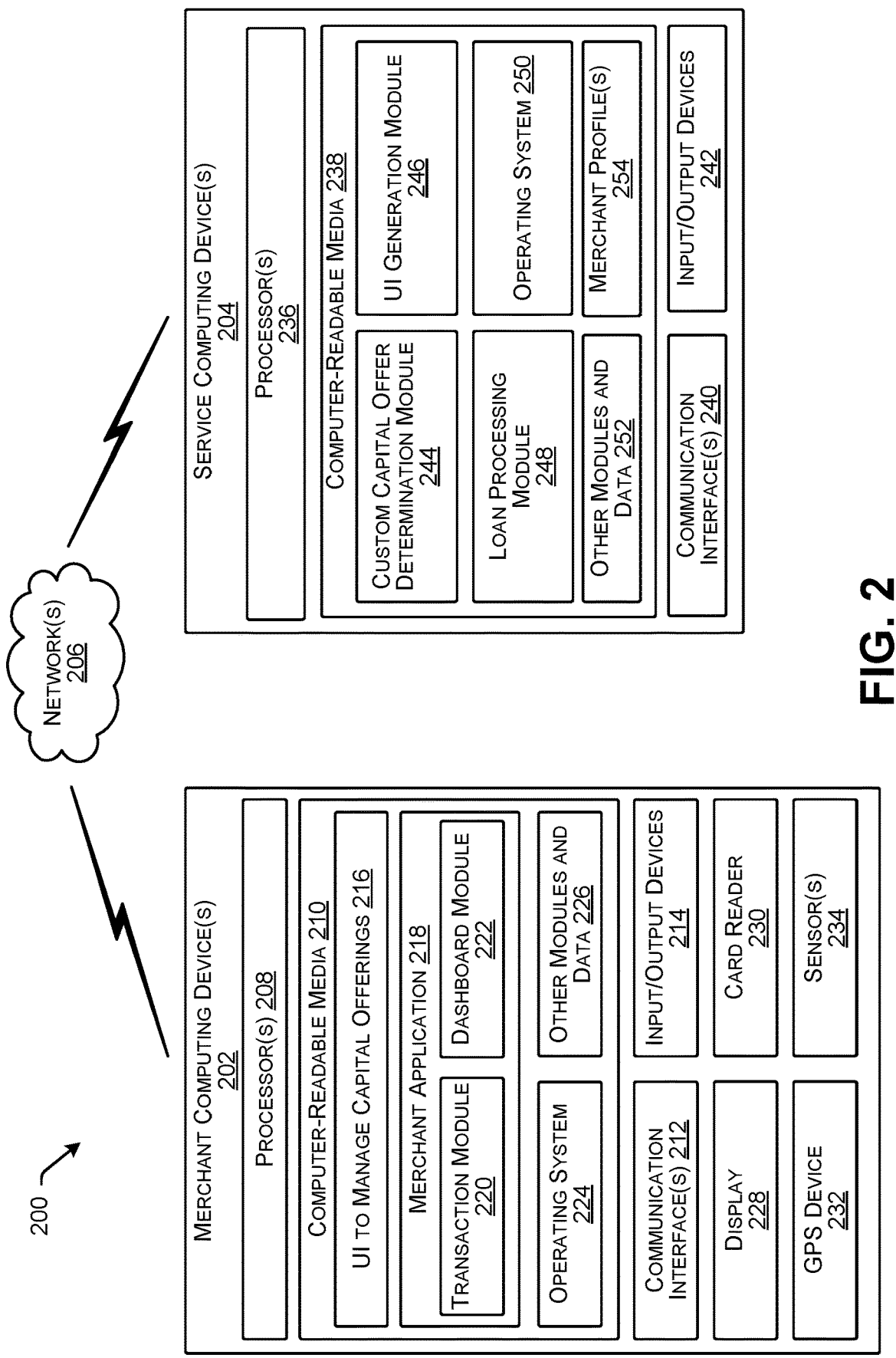
FIG. 2 illustrates an example system for generating and presenting a user interface that includes a slider to enable a potential borrower to view information associated with different loan products utilizing the slider according to some implementations.

FIG. 2 illustrates an example system 200 for generating and presenting user interfaces that include a slider to enable potential borrowers to view information associated with different loan products utilizing the slider according to some implementations. For the purpose of FIG. 2, a potential borrower can be a merchant. However, in alternative examples, a potential borrower can be an entity other than a merchant. The system includes merchant computing device(s) 202 (operated by merchant(s)) that communicate with service computing device(s) 204 (which can be associated with a service provider such as a payment processing service) via network(s) 206 (e.g., the Internet, cable network(s), cellular network(s), wireless network(s) (e.g., Wi-Fi) and wired network(s), as well as close-range communications such as Bluetooth®, Bluetooth® low energy, and the like).

In at least one example, the merchant computing device(s) 202 can be any suitable type of computing device, e.g., portable, semi-portable, semi-stationary, or stationary. Some examples of the merchant computing device(s) 202 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant computing device(s) 202 include one or more processors 208, one or more computer-readable media 210, one or more communication interfaces 212, and one or more input/output (I/O) devices 214. Each processor 208 can itself comprise one or more processors or processing cores. For example, the processor(s) 208 can be implemented as one or more microprocessors, microcomputers, microcontrollers, digital signal processors, central processing units, state machines, logic circuitries, and/or any devices that manipulate signals based on operational instructions. In some examples, the processor(s) 208 can be one or more hardware processors and/or logic circuits of any suitable type specifically programmed or configured to execute the algorithms and processes described herein. The processor(s) 208 can be configured to fetch and execute computer-readable processor-executable instructions stored in the computer-readable media 210.

Depending on the configuration of the merchant computing device(s) 202, the computer-readable media 210 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 210 can include, but is not limited to, RAM, ROM, EEPROM, flash memory, solid-state storage, magnetic disk storage, optical storage, and/or other computer-readable media technology. Further, in some examples, the merchant computing device(s) 202 can access external storage, such as RAID storage systems, storage arrays, network attached storage, storage area networks, cloud storage, or any other medium that can be used to store information and that can be accessed by the processor(s) 208 directly or through another computing device or network. Accordingly, the computer-readable media 210 can be computer storage media able to store instructions, modules or components that can be executed by the processor(s) 208. Further, when mentioned, non-transitory computer-readable media exclude media such as energy, carrier signals, electromagnetic waves, and signals per se.

The computer-readable media 210 can be used to store and maintain any number of functional components that are executable by the processor(s) 208. In some implementations, these functional components comprise instructions or programs that are executable by the processor(s) 208 and that, when executed, implement operational logic for performing the actions and services attributed above to the merchant computing device(s) 202. Functional components stored in the computer-readable media 210 can include a user interface (UI) to manage capital offerings 216 and a merchant application 218, which can include a transaction module 220 and a dashboard module 222.

The UI to manage capital offerings 216 can, among other things, present user interface(s) that enable a merchant to access capital offers and manage a capital offering process. In at least one example, the UI to manage capital offerings 216 can be presented via a web browser, or the like. In other examples, the UI to manage capital offerings can be presented via an application, such as a mobile application or desktop application, which is provided by the service provider, or which can be an otherwise dedicated application.

In at least one example, the UI to manage capital offerings 216 can receive instructions from the service computing device(s) 204. The instructions can instruct the UI to manage capital offerings 216 to present a user interface that enables a merchant to view information associated with different loan products utilizing a slider, as described above with reference to FIG. 1. As described above, the user interface can surface information associated with a particular custom capital offer that corresponds to a position of a control of the slider relative to a trackbar of the slider. That is, each region of the trackbar is associated with a particular custom capital offer and the UI to manage capital offerings 216 can determine which region is proximate to the control to determine which information to surface via the user interface. For the purpose of this discussion, a region can be proximate to the control if the control is within a threshold distance of the region and/or the distance between the control and the region is less than the distance between the control and any other region of the trackbar.

The UI to manage capital offerings 216 can update information presented via the user interface as the control is moved along the length of the trackbar of the slider. In at least one example, the UI to manage capital offerings 216 can determine an interaction between the control of the slider and the merchant. The UI to manage capital offerings 216 can determine that, based at least in part on the interaction, the control has been repositioned along the trackbar of the slider such to correspond to a new region of the trackbar. The UI to manage capital offerings 216 can determine that the new region corresponds to a particular custom capital offer and the UI to manage capital offerings 216 can update the user interface to present information associated with the new custom capital offer. As described above, each custom capital offer that is associated with a region of the trackbar can be specific to the merchant operating the merchant computing device(s) 202.

In some examples, the trackbar can be associated with custom capital offers that are associated with different loan products. In such examples, the UI to manage capital offerings 216 can cause the user interface to update differently when a merchant moves the control between custom capital offers associated with different loan products than when the merchant moves the control between custom capital offers associated with a same loan product. For instance, in at least one example, when the merchant moves the control between custom capital offers associated with a same loan product, the UI to manage capital offerings 216 can cause term(s) associated with a new custom capital offer to replace term(s) associated with a previous custom capital offer via a dissolve transition. Additionally and/or alternatively, in at least one example, when the merchant moves the control between custom capital offers associated with different loan products, the UI to manage capital offerings 216 can cause term(s) associated with a new custom capital offer to replace term(s) associated with a previous custom capital offer via a scroll transition, which in some examples, can be in a same direction as the movement of the control. Such differing transitions can provide a visual indicator to the merchant that the loan product has changed. Furthermore, when the merchant moves the control between custom capital offers associated with different loan products, the UI to manage capital offerings 216 can update the user interface in one or more other ways to visually distinguish between the different loan products.

As described above with reference to FIG. 1, in at least one example, the user interface can include a mechanism, the actuation of which indicates that the merchant accepts a particular custom capital offer. The mechanism can be a graphical control element, control, widget, etc. In at least one example, the UI to manage capital offerings 216 can determine when such a mechanism is actuated (e.g., by the merchant) and can send an instruction to the service computing device(s) 204 to initiate loan processing.

The merchant application 218 can provide POS functionality to the merchant computing device(s) 202 to enable the merchant to accept payments from one or more customers at a POS location. For example, the merchant can use the merchant computing device(s) 202 to accept payments through various different types of payment instruments, e.g., payment cards, electronic payment, cash or check, cryptocurrency, etc. at the POS location from the one or more customers. In at least one example, the transaction module 220 can present various user interfaces to enable a merchant to conduct transactions, receive payments, and so forth. In at least one example, the transaction module 220 can send data associated with the payments (e.g., transaction data) to the service computing device(s) 204. Further, the dashboard module 222 can enable the merchant to manage transactions, payments, and so forth, via a dashboard. For the purpose of this discussion, a dashboard can be a user interface that provides an at-a-glance view of key information (e.g., associated with transactions, payments, etc.).

Furthermore, the computer-readable media 210 can include additional functional components, such as an operating system 224 for controlling and managing various functions of the merchant computing device(s) 202 and for enabling basic user interactions. In addition, the computer-readable media 210 can also store data, data structures and the like, that are used by the functional components. Depending on the type of the merchant computing device(s) 202, the computer-readable media 210 can also optionally include other functional components and data, such as other modules and data 226, which can include programs, drivers, etc., and the data used or generated by the functional components. For instance, in some examples, the merchant computing device(s) 202 can include a payroll module, an inventory management module, an employee management module, a financing module, an appointment module, etc., which can facilitate payroll services, inventory management services, employee management services, financing services, appointment services, etc., respectively. Further, the merchant computing device(s) 202 can include many other logical, programmatic and physical components, of which those described are merely examples that are related to the discussion herein.

The communication interface(s) 214 can include one or more interfaces and hardware components for enabling communication with various other devices, such as over the network(s) 206 or directly. For example, communication interface(s) 214 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The merchant computing device(s) 202 can further include the one or more I/O devices 216. The I/O devices 216 can include speakers, a microphone, a camera, and various user controls (e.g., buttons, a joystick, a keyboard, a keypad, etc.), a haptic output device, and so forth.

In at least one example, merchant computing device(s) 202 can include a display 228. Depending on the type of computing device(s) used as the merchant computing device(s) 202, the display 228 can employ any suitable display technology. For example, the display 228 can be a liquid crystal display, a plasma display, a light emitting diode display, an OLED (organic light-emitting diode) display, an electronic paper display, or any other suitable type of display able to present digital content thereon. In some examples, the display 228 can have a touch sensor associated with the display 228 to provide a touchscreen display configured to receive touch inputs for enabling interaction with a graphic interface presented on the display 228. Accordingly, implementations herein are not limited to any particular display technology. Alternatively, in some examples, the merchant computing device(s) 202 may not include the display 228, and information can be presented by other means, such as aurally.

In addition, in some examples, the merchant computing device(s) 202 can include or can be connectable to a card reader 230. In some examples, the card reader 230 can plug in to a port in the merchant computing device(s) 202, such as a microphone/headphone port, a data port, or other suitable port. The card reader 230 can include a read head for reading a magnetic strip of a payment card, and further can include encryption technology for encrypting the information read from the magnetic strip. Alternatively, numerous other types of card readers can be employed with the merchant computing device(s) 202 herein, depending on the type and configuration of the merchant computing device(s) 202.

Other components included in the merchant computing device(s) 202 can include a GPS device 232 able to indicate location information. Further, the merchant computing device(s) 202 can include one or more sensors 234, such as an accelerometer, gyroscope, compass, proximity sensor, camera, microphone, and/or a switch, as discussed above. Additionally, the merchant computing device(s) 202 can include various other components that are not shown, examples of which include removable storage, a power source, such as a battery and power control unit, a barcode scanner, a printer, a cash drawer, and so forth.

As described above, techniques described herein are directed to presenting custom capital offers to merchant(s) on behalf of a service provider. In at least one example, the service provider can be a payment processing service, which can leverage merchant data associated with merchants to generate and present such custom capital offers to merchant(s). In at least one example, the service provider can operate the service computing device(s) 204. The service computing device(s) 204 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the service computing device(s) 204 as being present in a single location, these components and data can alternatively be distributed across different computing devices and different locations in any manner. Consequently, the functions can be implemented by one or more service computing devices, with the various functionality described above distributed in various ways across the different computing devices. Multiple service computing device(s) 204 can be located together or separately, and organized, for example, as virtual servers, server banks and/or server farms. The described functionality can be provided by the servers of a single entity or enterprise, or can be provided by the servers and/or services of multiple different customers or enterprises.

In the illustrated example, the service computing device(s) 204 can include one or more processors 236, one or more computer-readable media 238, one or more communication interfaces 240, and one or more input/output devices 242. Each processor 236 can be a single processing unit or a number of processing units, and can include single or multiple computing units or multiple processing cores. The processor(s) 236 can be implemented as one or more microprocessors, microcomputers, microcontrollers, digital signal processors, central processing units, state machines, logic circuitries, and/or any devices that manipulate signals based on operational instructions. For example, the processor(s) 236 can be one or more hardware processors and/or logic circuits of any suitable type specifically programmed or configured to execute the algorithms and processes described herein. The processor(s) 236 can be configured to fetch and execute computer-readable instructions stored in the computer-readable media 238, which can program the processor(s) 236 to perform the functions described herein.

The computer-readable media 238 can include volatile and nonvolatile memory and/or removable and non-removable media implemented in any type of technology for storage of information, such as computer-readable instructions, data structures, program modules, or other data. Such computer-readable media 238 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 204, the computer-readable media 238 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 238 can be used to store any number of functional components that are executable by the processors 236. In many implementations, these functional components comprise instructions or programs that are executable by the processors 236 and that, when executed, specifically configure the one or more processors 236 to perform the actions attributed above to the service provider and/or payment processing service. Functional components stored in the computer-readable media 238 can include a custom capital offer determination module 244, a user interface (UI) generation module 246, and a loan processing module 248.

The custom capital offer determination module 244 can determine a plurality of custom capital offers for a particular merchant. In at least one example, the custom capital offer determination module 244 can access merchant data stored in merchant profile(s), described below, and can analyze the merchant data to determine a range of funds that the merchant is qualified to receive (e.g., a minimum and a maximum amount of funds that the payment processing service is willing to make available to the merchant). The custom capital offer determination module 244 can utilize one or more risk analysis techniques to determine the range of funds that the merchant is qualified to receive. Based at least in part on determining the range of funds that the merchant is qualified to receive, the custom capital offer determination module 244 can determine one or more increments within that range of funds. In at least one example, each increment can correspond to an individual custom capital offer. The amount of funds between individual increments does not need to be equal; that is, in some examples, subsequent custom capital offers can be linearly related and in other examples, subsequent custom capital offers can be non-linearly (e.g., exponentially) related.

In at least one example, the custom capital offer determination module 244 can determine the number of increments based at least in part on the range of funds. For instance, if a merchant is determined to be qualified to receive $10,000 via a capital loan, such a range can be divided into fewer increments than a merchant that is determined to be qualified to receive $50,000. Additionally and/or alternatively, in some examples, the number of increments can be determined based on merchant data. For instance, in at least one example, the custom capital offer determination module 244 can utilize a data model, metric, and/or machine learning mechanism to determine an appropriate number of increments for a particular merchant. As an example, the custom capital offer determination module 244 can utilize amounts of previous capital loans accepted by the merchant to determine the number of increments in which to divide the range of funds.

The custom capital offer determination module 244 can determine a break point (e.g., a value or range of values) where the loan product associated with a custom capital offer transitions from a first loan product (e.g., daily repayment) to a second loan product (e.g., monthly repayment). In at least one example, such a break point can be determined based on an amount of the custom capital offer. For instance, in such an example, custom capital offers below a threshold value can be associated with a first loan product and custom capital offers above a threshold value can be associated with a second loan product. Additionally and/or alternatively, the break point can be based at least in part on merchant data associated with the merchant. For instance, in at least one example, the break point can be determined based on a risk assessment associated with a particular merchant. That is, a merchant that poses more risk to the payment processing service (e.g., is less likely to be able to pay back a loan) may have a different break point than a merchant that poses less risk to the payment processing service (e.g., is more likely to be able to pay back a loan).

The UI generation module 246 can determine instructions for generating a user interface. In at least one example, the UI generation module 246 can determine instructions to associate a custom capital offer with a particular region of a trackbar of a slider. As described herein, each custom capital offer can be associated with one or more terms. The UI generation module 246 can associate such term(s) with the same region of the trackbar such that when a control associated with the slider is proximate to the region, the term(s) relevant to the corresponding custom capital offer are presented via a user interface. The UI generation module 246 can send the instructions to the merchant computing device(s) 202.

In some examples, the UI generation module 246 can generate and/or send the instructions to the merchant computing device(s) 202 responsive to receiving an indication of interest from the merchant computing device(s) 202. In at least one example, the UI generation module 246 can send information associated with a capital loan product (and perhaps pre-approval) to the merchant computing device(s) 202. For instance, in some examples, the UI generation module 246 can send an electronic communication (e.g., an email, a text message, a push notification, etc.) to an address associated with a merchant profile of a merchant. In at least one example, the address can correspond to the merchant computing device(s) 202 such that the merchant computing device(s) 202 present the communication to the merchant. In such examples, the communication can include a mechanism, the actuation of which causes an indication of interest to be sent to the service computing device(s) 204. The UI generation module 246 can receive the indication of interest. In such examples, the indication of interest can be associated with an identity of the merchant. The UI generation module 246 can retrieve the plurality of custom capital offers associated with the merchant and can determine instructions for generating the user interface. The UI generation module 246 can send the instructions to the merchant computing device(s) 202. That is, in at least one example, the UI generation module 246 can send the instructions to the merchant computing device(s) 202 responsive to receiving the indication of interest.

In additional and/or alternative examples, the UI generation module 246 can cause a notification to be presented via a dashboard presented via the merchant computing device(s) 202. For instance, in at least one example, the UI generation module 246 can send instructions to the dashboard module 222 to cause the dashboard module 222 to provide a notification that the merchant is qualified for a capital loan in association with the merchant's dashboard. In such examples, the notification can include a mechanism, the actuation of which causes an indication of interest to be sent to the service computing device(s) 204. The UI generation module 246 can receive the indication of interest. In such examples, the indication of interest can be associated with an identity of the merchant. The UI generation module 246 can retrieve the plurality of custom capital offers associated with the merchant and can determine instructions for generating the user interface. The UI generation module 246 can send the instructions to the merchant computing device(s) 202. That is, in at least one example, the UI generation module 246 can send the instructions to the merchant computing device(s) 202 responsive to receiving the indication of interest.

Furthermore, in at least one example, the UI generation module 246 can cause a webpage to be presented via a website associated with the payment processing service. The webpage can provide information about capital loan products. In at least one example, the website can include a mechanism, the actuation of which causes an indication of interest to be sent to the service computing device(s) 204. The UI generation module 246 can receive the indication of interest. In at least one example, the indication of interest can be associated with an identity of the merchant. The UI generation module 246 can retrieve the plurality of custom capital offers associated with the merchant and can determine instructions for generating the user interface. The UI generation module 246 can send the instructions to the merchant computing device(s) 202. That is, in at least one example, the UI generation module 246 can send the instructions to the merchant computing device(s) 202 responsive to receiving the indication of interest.

In some examples, the webpage can be accessed by a merchant without the merchant providing an indication of the identity of the merchant. In such examples, the UI generation module 246 can receive the indication of interest, determine that the merchant associated with the indication of interest is unidentified, and send a notification to the custom capital offer determination module 244. Responsive to receiving such a notification, the custom capital offer determination module 244 can send a request, via the website for example, for information associated with the merchant. The information can include a merchant identifier, if the merchant has an existing merchant profile associated with the payment processing service, or the information can include merchant information sufficient to establish a merchant profile for the merchant. Based on receiving such information, the custom capital offer determination module 244 can determine a plurality of custom capital offers and/or retrieve a plurality of previously generated custom capital offers associated with the merchant and the UI generation module 246 can determine instructions for generating a user interface based on the plurality of custom capital offers (recently or previously generated).

The loan processing module 248 can receive an instruction from the merchant computing device(s) 202 indicating that the merchant accepts an offer for a custom capital loan. The instruction can indicate which custom capital offer the merchant accepts, which can be determined based on a position of the control along the length of the trackbar of the slider. Based at least in part on receiving the instruction, the loan processing module 248 can initiate processing the loan. That is, the loan processing module 248 can send one or more requests for information to process the loan. In at least one example, the loan processing module 248 can send a request for an affirmation that the merchant agrees to the terms of the loan (e.g., in addition to actuating the mechanism associated with the capital offer on the user interface). Responsive to receiving an affirmation that the merchant agrees to the terms of the loan, the loan processing module 248 can send an instruction to transfer an amount of funds corresponding to at least a portion of the loan to an account of the merchant. In at least one example, the amount of funds can be transferred from an account of the payment processing service to an account of the merchant via an electronic funds transfer and/or other near-real time transfer.

Additional functional components stored in the computer-readable media 238 can include an operating system 250 for controlling and managing various functions of the service computing device(s) 204.

In at least one example, the computer-readable media 238 can include or maintain other functional components and data, such as other modules and data 252, which can include programs, drivers, etc., and the data used or generated by the functional components. Further, the service computing device(s) 204 can include many other logical, programmatic and physical components, of which those described above are merely examples that are related to the discussion herein.

In addition, the computer-readable media 238 can store data used for performing the operations described herein. Thus, the computer-readable media 238 can store merchant profile(s) 254. In at least one example, the merchant profile(s) 254 can store information associated with individual merchant(s). For instance, a merchant profile of the merchant profile(s) 254 can store merchant data including, but not limited to, a merchant category classification (MCC), item(s) offered for sale by the merchant, transaction data associated with transactions conducted by the merchant (e.g., via the merchant application 218), hardware (e.g., device type) used by the merchant, previous loans made to the merchant, previous defaults on said loans, an indication of risk (e.g., based at least in part on fraud, chargeback, etc.) associated with the merchant, etc.

As described above, in some examples, merchant computing device(s) 202 can execute an instance of a merchant application 218 that is installed to configure the merchant computing device(s) 202 as a POS terminal. In such examples, the merchant application 218 (e.g., via the transaction module 220) can communicate transaction data to the service computing device(s) 204. In at least one example, the merchant profile(s) 254 can store transaction data received from the merchant application 218. In at least one example, a merchant profile can store data derived from the transaction data. For instance, a merchant profile can store merchant data indicating a volume of transactions processed by the payment processing service on behalf of the merchant, a frequency of transactions processed by the payment processing service on behalf of the merchant, etc.

The communication interface(s) 240 can include one or more interfaces and hardware components for enabling communication with various other devices, such as over the network(s) 206. For example, communication interface(s) 240 can enable communication through one or more of the Internet, cable networks, cellular networks, wireless networks (e.g., Wi-Fi) and wired networks, as well as close-range communications such as Bluetooth®, Bluetooth® low energy, and the like, as additionally enumerated elsewhere herein.

The service computing device(s) 204 can further be equipped with various input/output (I/O) devices 242. Such I/O devices 242 can include a display, various user interface controls (e.g., buttons, joystick, keyboard, mouse, touch screen, etc.), audio speakers, connection ports and so forth.

Figure 3:
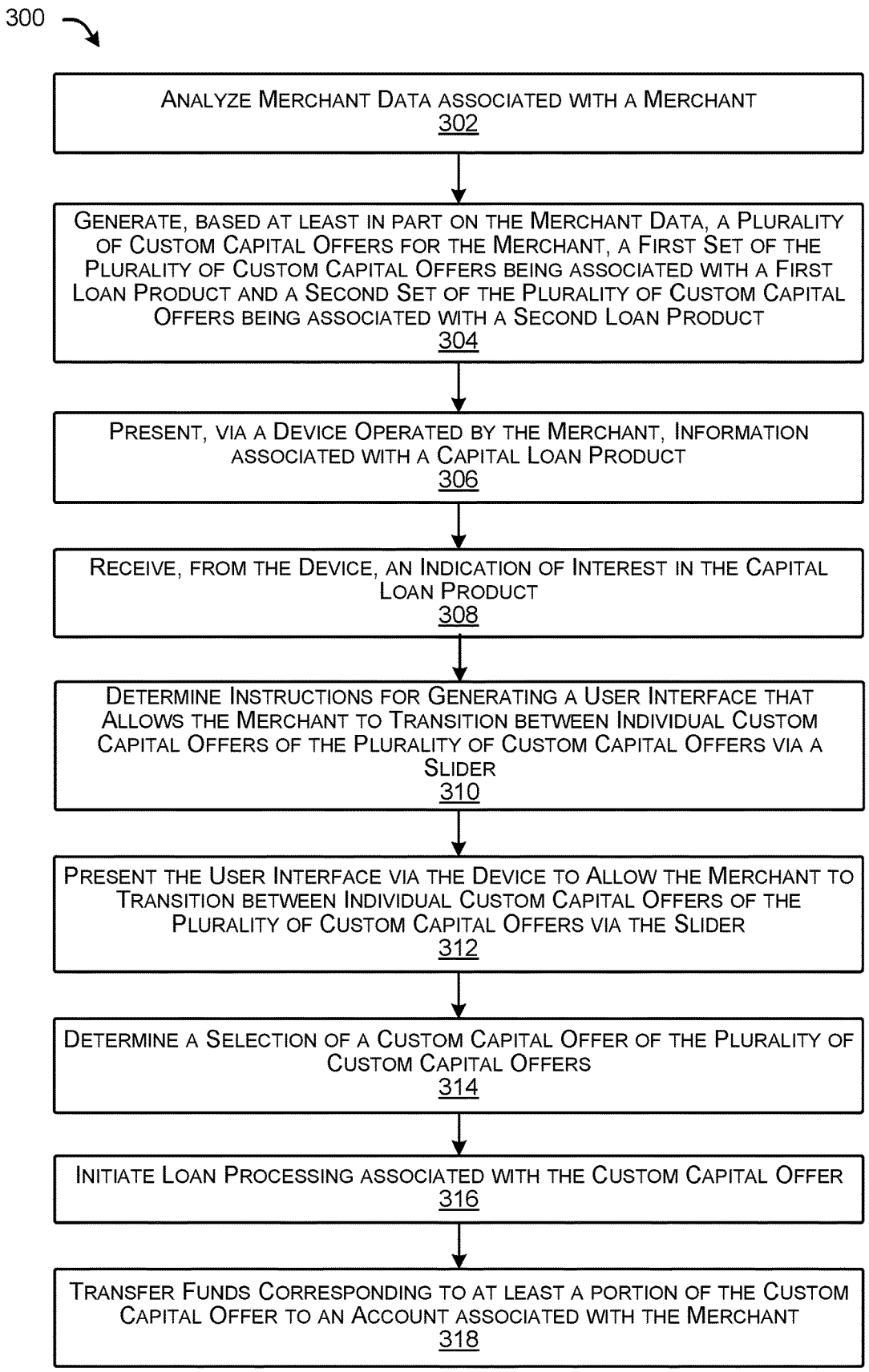
FIG. 3 illustrates an example process for presenting a user interface that includes a slider to enable a potential borrower to view information associated with different loan products utilizing the slider according to some implementations.
Figure 5:
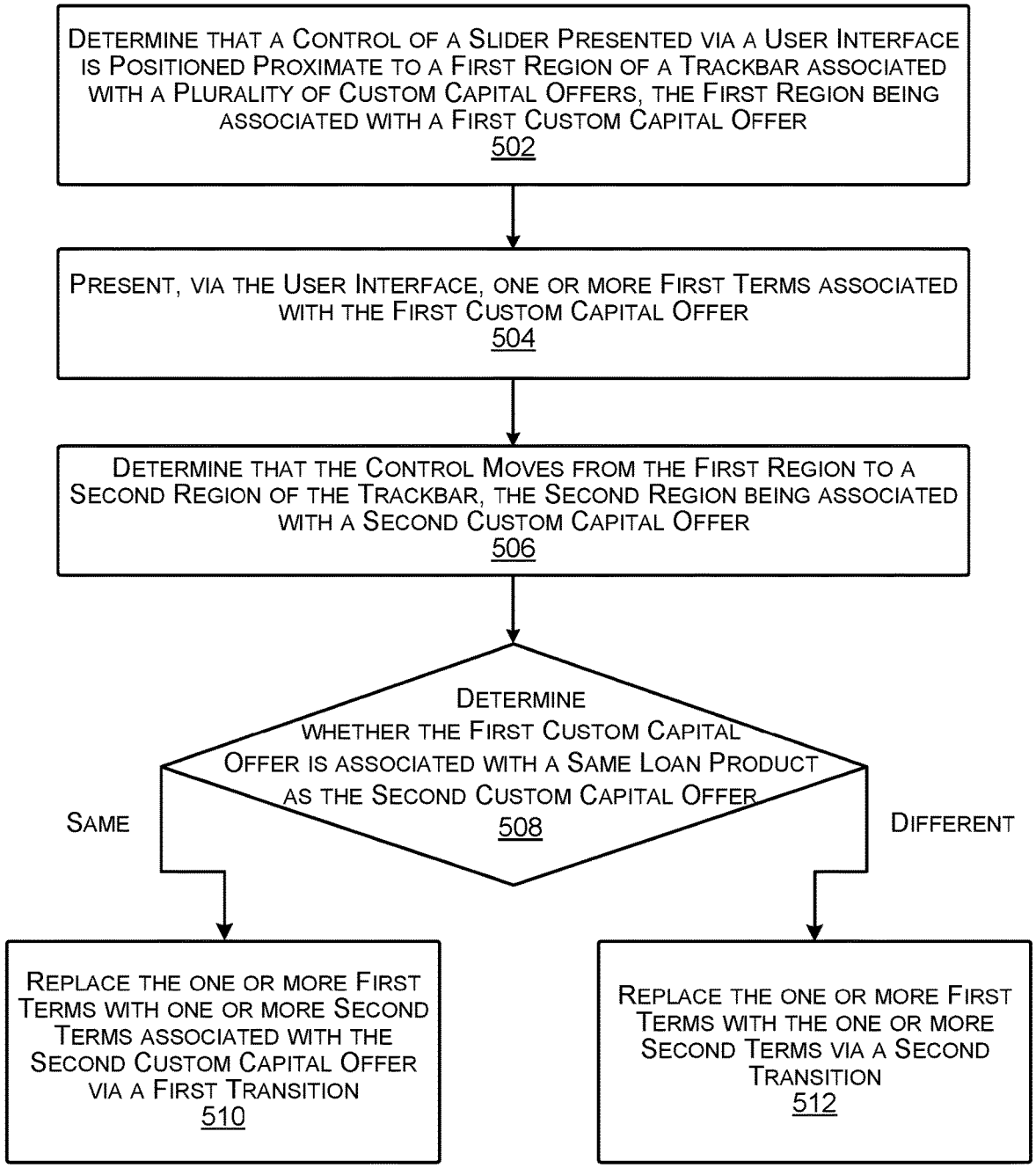
FIG. 5 illustrates an example process for updating a user interface that includes a slider to enable potential borrowers to view information associated with different loan products utilizing the slider according to some implementations.

FIGS. 3-5 are flow diagrams illustrating example processes according to some implementations. The processes of FIGS. 3-5 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processors to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 3-5 can be combined with some or all of the operations illustrated in others of FIGS. 3-5. For discussion purposes, the processes are described with reference to the environments, architectures and devices described in the examples herein, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

FIG. 3 illustrates an example process 300 for presenting a user interface that includes a slider to enable a potential borrower to view information associated with different loan products utilizing the slider. FIG. 3 is described in the context of the system described above with reference to FIG. 2, but is not limited to such systems.

Block 302 illustrates analyzing merchant data associated with a merchant. As described above, the service computing device(s) 204 can store merchant profile(s) 254. A merchant profile of the merchant profile(s) 254 can store merchant data including, but not limited to, a merchant category classification (MCC), item(s) offered for sale by the merchant, transaction data associated with transactions conducted by the merchant (e.g., via the merchant application 218), hardware (e.g., device type) used by the merchant, previous loans made to the merchant, previous defaults on said loans, an indication of risk (e.g., based at least in part on fraud, chargeback, etc.) associated with the merchant, etc. In at least one example, a merchant profile can store data derived from the transaction data. For instance, a merchant profile can store merchant data indicating a volume of transactions processed by the payment processing service on behalf of the merchant, a frequency of transactions processed by the payment processing service on behalf of the merchant, etc. In at least one example, the custom capital offer determination module 244 associated with the service computing device(s) 204 can access the merchant data from the merchant profile(s) 254 and can analyze the merchant data.

Block 304 illustrates generating, based at least in part on the merchant data, a plurality of custom capital offers for the merchant, a first set of the plurality of custom capital offers being associated with a first loan product and a second set of the plurality of custom capital offers being associated with a second loan product. In accordance with at least one example, each loan product has a distinct repayment method (e.g., daily percentage from sales, or a monthly fixed amount). The custom capital offer determination module 244 associated with the service computing device(s) 204 can determine a plurality of custom capital offers for a particular merchant. In at least one example, the custom capital offer determination module 244 can access merchant data stored in merchant profile(s) 254 and can analyze the merchant data to determine a plurality of custom capital offers for the particular merchant. Additional details associated with determining a plurality of custom capital offers for a particular merchant are described below with reference to FIG. 4. In at least one example, a first set of the plurality of custom capital offers can be associated with a first loan product, such as a daily repayment loan product, and a second set of the plurality of custom capital offers can be associated with a second loan product, such as a fixed monthly repayment loan product, as described above.

Block 306 illustrates presenting, via a device operated by the merchant, information associated with a capital loan product. In at least one example, the UI generation module 246 associated with the service computing device(s) 204 can send information about a capital loan product to the merchant computing device(s) 202. As described above, a capital loan product is a product that facilitates the offering and/or lending of a loan to a borrower that is to be used for financing the borrower's short-term operational needs. For at least this example, the first loan product and the second loan product can be associated with a same capital loan product (e.g., offered by the payment processing service).

In some examples, the UI generation module 246 can send an electronic communication (e.g., an email, a text message, a push notification, etc.) to an address associated with a merchant profile of a merchant. The address can correspond to the merchant computing device(s) 202 such that the merchant computing device(s) 202 present the communication to the merchant. In such examples, the communication can include a mechanism, the actuation of which causes an indication of interest to be sent to the service computing device(s) 204.

In additional and/or alternative examples, the UI generation module 246 can cause a notification to be presented via a dashboard presented via the merchant computing device(s) 202. For instance, in at least one example, the UI generation module 246 can send instructions to the dashboard module 222 to cause the dashboard module 222 to provide a notification that the merchant is qualified for a capital loan in association with the merchant's dashboard. In such examples, the notification can include a mechanism, the actuation of which causes an indication of interest to be sent to the service computing device(s) 204.

Furthermore, in at least one example, the UI generation module 246 can cause a webpage to be presented via a website associated with the payment processing service. The webpage can provide information about capital loan products. In at least one example, the website can include a mechanism, the actuation of which causes an indication of interest to be sent to the service computing device(s) 204.

Block 308 illustrates receiving, from the device, an indication of interest in the capital loan product. As described above, in some examples, the UI generation module 246 can send information to the merchant computing device(s) 202. In such examples, the information can be associated with an electronic communication, a notification, and/or a website which can include a mechanism, the actuation of which causes an indication of interest to be sent to the service computing device(s) 204. In at least one example, the merchant computing device(s) 202 can determine that the merchant actuates the mechanism, thereby generating an indication of interest, which can be sent to the service computing device(s) 204. The UI generation module 246 can receive the indication of interest.

Block 310 illustrates determining instructions for generating a user interface that allows the merchant to transition between individual custom capital offers of the plurality of custom capital offers via a slider. The UI generation module 246 can determine instructions for generating a user interface that is to be presented via the merchant computing device(s) 202. In at least one example, responsive to receiving an indication of interest from the merchant, the UI generation module 246 can retrieve a plurality of custom capital offers determined for the merchant and can utilize the plurality of custom capital offers to determine instructions for generating a user interface. In at least one example, the UI generation module 246 can determine instructions to associate each custom capital offer of the plurality of custom capital offers with a particular region of a trackbar of a slider. As described herein, each custom capital offer can be associated with one or more terms. The UI generation module 246 can associate such term(s) with the same region of the trackbar such that when a control associated with the slider is proximate to the region, the term(s) relevant to the corresponding custom capital offer are presented via a user interface. Additional details associated with determining a plurality of custom capital offers for a particular merchant are described below with reference to FIG. 4. The UI generation module 246 can send the instructions to the merchant computing device(s) 202.

Block 312 illustrates presenting the user interface via the device to allow the merchant to transition between individual custom capital offers of the plurality of custom capital offers via the slider. In at least one example, the UI to manage capital offerings 216 associated with the merchant computing device(s) 202 can receive the instructions from the service computing device(s) 204. The instructions can instruct the UI to manage capital offerings 216 to present a user interface that enables a merchant to view information associated with different loan products utilizing a slider, as described above with reference to FIG. 1. That is, the UI to manage capital offerings 216 can utilize the instructions to present a user interface that enables a merchant to view information associated with different loan products utilizing a slider. As described above, the user interface can surface information associated with a particular custom capital offer that corresponds to a position of a control of the slider relative to a trackbar of the slider. That is, each region of the trackbar is associated with a particular custom capital offer and the UI to manage capital offerings 216 can determine which region is proximate to the control to determine which information to surface via the user interface.

Block 314 illustrates determining a selection of a custom capital offer of the plurality of custom capital offers. As described above with reference to FIG. 1, in at least one example, the user interface can include a mechanism, the actuation of which indicates that the merchant accepts a particular custom capital offer. The mechanism can be a graphical control element, control, widget, etc. In at least one example, the UI to manage capital offerings 216 can determine when such a mechanism is actuated (e.g., by the merchant) and can send an instruction to the service computing device(s) 204 to initiate loan processing. The loan processing module 248 can receive an instruction from the merchant computing device(s) 202 indicating that the merchant accepts an offer for a custom capital loan. The instruction can indicate which custom capital offer the merchant accepts, which can be determined based on a position of the control along the length of the trackbar of the slider when the merchant interacted with the mechanism presented via the user interface.

Block 316 illustrates initiating loan processing associated with the custom capital offer. Based at least in part on receiving the instruction, the loan processing module 248 associated with the service computing device(s) 204 can initiate processing the loan. That is, the loan processing module 248 can send one or more requests for information to process the loan. In at least one example, the loan processing module 248 can send a request for an affirmation that the merchant agrees to the terms of the loan (e.g., in addition to actuating the mechanism associated with the capital offer on the user interface).

Block 318 illustrates transferring funds corresponding to at least a portion of the custom capital offer to an account associated with the merchant. Responsive to receiving an affirmation that the merchant agrees to the terms of the loan, the loan processing module 248 can send an instruction to transfer an amount of funds corresponding to at least a portion of the loan to an account of the merchant. In at least one example, the amount of funds can be transferred from an account of the payment processing service to an account of the merchant via an electronic funds transfer and/or other near-real time transfer.

In at least one example, blocks 316 and 318 can be performed with no, or with minimal, input from the merchant. That is, in at least one example, the service computing device(s) 204 can initiate processing of the loan and can facilitate the transfer of funds without input (or with minimal input) from the merchant. That is, rather than the merchant filling out loan processing paper work, reading additional disclosure forms, and waiting for funds to go into their account, techniques described herein can expedite loan processing via the slider user interface and selection mechanism that enables the merchant to select a capital loan product.

FIG. 4 illustrates an example process 400 for generating and presenting a user interface that includes a slider to enable a potential borrower to view information associated with different loan products utilizing the slider. FIG. 4 is described in the context of the system described above with reference to FIG. 2, but is not limited to such systems.

Block 402 illustrates determining, based at least in part on merchant data associated with a merchant, a range of funds available for the merchant via a capital loan product. The custom capital offer determination module 244 associated with the service computing device(s) 204 can access merchant data stored in merchant profile(s) 254 and can analyze the merchant data to determine a range of funds that the merchant is qualified to receive (e.g., a minimum and a maximum amount of funds that the payment processing service is willing to make available to the merchant). The custom capital offer determination module 244 can utilize one or more risk analysis techniques to determine the range of funds that the merchant is qualified to receive.

Block 404 illustrates determining, based at least in part on the merchant data, increments within the range of funds, each increment corresponding to an individual custom capital offer. Based at least in part on determining the range of funds that the merchant is qualified to receive, the custom capital offer determination module 244 can determine one or more increments within that range of funds. In at least one example, each increment can correspond to an individual custom capital offer. The amount of funds between individual increments does not need to be equal; that is, in some examples, subsequent custom capital offers can be linearly related and in other examples, subsequent custom capital offers can be non-linearly (e.g., exponentially) related.

In at least one example, the custom capital offer determination module 244 can determine the number of increments based at least in part on the range of funds. For instance, if a merchant is determined to be qualified to receive $10,000 via a capital loan, such a range can be divided into fewer increments than a merchant that is determined to be qualified to receive $50,000. Additionally and/or alternatively, in some examples, the number of increments can be determined based on merchant data. For instance, in at least one example, the custom capital offer determination module 244 can utilize a data model, metric, and/or machine learning mechanism to determine appropriate increments for a particular merchant. As an example, the custom capital offer determination module 244 can utilize amounts of previous capital loans accepted by the merchant to determine the number of increments in which to divide the range of funds.

Block 406 illustrates determining, based at least in part on the merchant data, a break point wherein individual custom capital offers transition from a first loan product to a second loan product. The custom capital offer determination module 244 can determine a break point (e.g., a value or range of values) where the loan product associated with a custom capital offer transitions from a first loan product (e.g., daily repayment) to a second loan product (e.g., monthly repayment). In at least one example, such a break point can be determined based on an amount of the custom capital offer. For instance, in such an example, custom capital offers below a threshold value can be associated with a first loan product and custom capital offers above a threshold value can be associated with a second loan product. Additionally and/or alternatively, the break point can be based at least in part on merchant data associated with the merchant. For instance, in at least one example, the break point can be determined based on a risk assessment associated with a particular merchant. That is, a merchant that poses more risk to the payment processing service (e.g., is less likely to be able to pay back a loan) may have a different break point than a merchant that poses less risk to the payment processing service (e.g., is more likely to be able to pay back a loan).

Block 408 illustrates associating each custom capital offer with a region of a trackbar of a slider. The UI generation module 246 can determine instructions for generating a user interface. In at least one example, the UI generation module 246 can determine instructions to associate a custom capital offer with a particular region of a trackbar of a slider. As described herein, each custom capital offer can be associated with one or more terms. The UI generation module 246 can associate such term(s) with the same region of the trackbar such that when a control associated with the slider is proximate to the region, the term(s) relevant to the corresponding custom capital offer are presented via a user interface. The UI generation module 246 can send the instructions to the merchant computing device(s) 202.

Block 410 illustrates presenting, via a device operated by the merchant, the slider via a user interface that allows the merchant to transition between custom capital offers associated with different loan products by changing a position of a control of the slider relative to the trackbar. In at least one example, the UI to manage capital offerings 216 associated with the merchant computing device(s) 202 can receive instructions from the service computing device(s) 204. The instructions can instruct the UI to manage capital offerings 216 to present a user interface that enables a merchant to view information associated with different loan products utilizing a slider, as described above with reference to FIG. 1. As described above, the user interface can surface information associated with a particular custom capital offer that corresponds to a position of a control of the slider relative to a trackbar of the slider. That is, each region of the trackbar is associated with a particular custom capital offer and the UI to manage capital offerings 216 can determine which region is proximate to the control to determine which information to surface via the user interface.

As described above, in at least one example, each user interface generated and/or presented via techniques described herein can be customized for a particular user. That is, each of the custom capital offers presented via a user interface can be customized for a particular user such that two potential borrowers can be presented with user interfaces that present different capital offers that are particular to them. As a user advances the control along the length of the trackbar, the user can be presented with capital offers that are specific to the user. That is, the user interface described herein can be unique in the number of custom capital offers that are presented to a user, the number of custom capital offers associated with a first loan product and the number of custom capital offers associated with a second loan product, and how such custom capital offers are presented along the length of the trackbar of the slider. As such, as a user advances to each offer (e.g., via interaction with the control), each region of the trackbar is customized for a particular user, and the user is presented with a user-specific capital offer.

FIG. 5 illustrates an example process 500 for updating a user interface that includes a slider to enable potential borrowers to view information associated with different loan products utilizing the slider. FIG. 5 is described in the context of the system described above with reference to FIG. 2, but is not limited to such systems.

Block 502 illustrates determining that a control of a slider presented via a user interface is positioned proximate to a first region of a trackbar associated with a plurality of custom capital offers, the first region being associated with a first custom capital offer. As described above, in at least one example, the UI to manage capital offerings 216 associated with the merchant computing device(s) 202 can receive instructions from the service computing device(s) 204. The instructions can instruct the UI to manage capital offerings 216 to present a user interface that enables a merchant to view information associated with different loan products utilizing a slider. As described above, the user interface can surface information associated with a particular custom capital offer that corresponds to a position of a control of the slider relative to a trackbar of the slider. That is, each region of the trackbar is associated with a particular custom capital offer and the UI to manage capital offerings 216 can determine which region is proximate to the control to determine which information to surface via the user interface.

In at least one example, the UI to manage capital offerings 216 can determine that the control is positioned proximate to a first region of the trackbar. The first region can correspond to a first custom capital offer.

Block 504 illustrates presenting, via the user interface, one or more first terms associated with the first custom capital offer. Based at least in part on determining that the control of the slider is proximate to a first region corresponding to a first custom capital offer, the UI to manage capital offerings 216 can present term(s) associated with the first custom capital offer via the user interface. As described above, the term(s) can include, but are not limited to, a total amount to be repaid, a repayment method, an amount to be repaid per repayment period, a total amount of funds to be loaned to the user, a term length (e.g., when complete repayment is due), processing fees, etc. In at least one example, such term(s) can be presented as text element(s) via the user interface.

Figure 6:
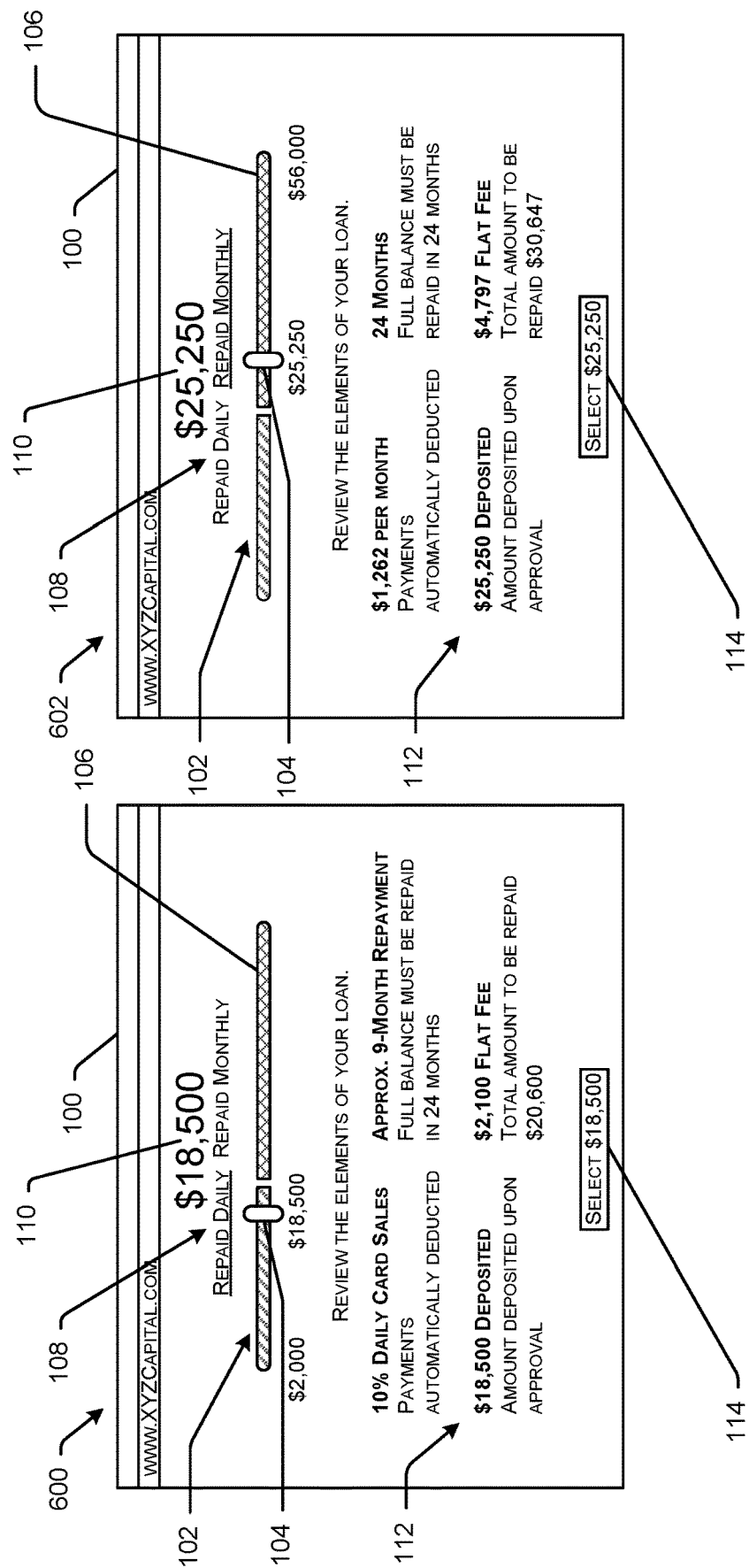
FIG. 6 illustrates a user interface that includes a slider to enable potential borrowers to view information associated with different loan products utilizing the slider according to some implementations.

FIG. 6 illustrates two instances of the user interface 100, described above with reference to FIG. 1, that includes a slider 102 to enable potential borrowers to view information associated with different loan products utilizing the slider 102. The first instance 600 of the user interface 100 illustrates an example of the user interface 100 when the control 104 of the slider 102 is proximate to a region of the trackbar 106 corresponding to a first custom capital offer for $18,500. As illustrated in the first instance 600 of the user interface 100, the amount of the first custom capital offer (e.g., $18,500) can be presented as a text element 110 at or near the top of the user interface 100. Additionally, term(s) associated with the first custom capital offer can be presented as text element(s) 112.

As illustrated in FIG. 6, the merchant can determine that the first custom capital offer is associated with a first loan product, for daily repayment. Several indicators provide visual cues for the merchant to do so. For instance, a text element of the text element(s) 108 that identify the different types of loan products is underlined, indicating that the first custom capital offer is associated with a daily repayment product. Additionally, the control 104 is positioned in a region of the trackbar 106 that is shaded in a first shading, which is visually distinct from a second shading representative of capital offers associated with the second loan product. Lastly, the term(s), as represented by text element(s) 112, enable the merchant to review the elements of the corresponding loan.

Returning to FIG. 5, block 506 illustrates determining that the control moves from the first region to a second region of the trackbar, the second region being associated with a second custom capital offer. In at least one example, the merchant can interact with the user interface such to move the control along the length of the trackbar. The UI to manage capital offerings 216 can update information presented via the user interface as the control is moved along the length of the trackbar of the slider. In at least one example, the UI to manage capital offerings 216 can determine an interaction between the control of the slider and the merchant. The UI to manage capital offerings 216 can determine that, based at least in part on the interaction, that the control has been repositioned along the trackbar of the slider such to correspond to a new region of the trackbar. The UI to manage capital offerings 216 can determine that the new region corresponds to a particular custom capital offer and the UI to manage capital offerings 216 can update the user interface to present information associated with the new custom capital offer.

For instance, the UI to manage capital offerings 216 can determine that the merchant moves the control from being proximate to the first region to being proximate to a second region of the trackbar. The second region can correspond to a second custom capital offer.

As described above, FIG. 6 illustrates two instances of the user interface 100 that includes a slider 102 to enable potential borrowers to view information associated with different loan products utilizing the slider 102. The second instance 602 of the user interface 100 illustrates an example of the user interface 100 when the control 104 of the slider 102 is proximate to a region of the trackbar 106 corresponding to a second custom capital offer for $25,250. As illustrated in the second instance 602 of the user interface 100, the amount of the second custom capital offer (e.g., $25,250) can be presented as a text element at or near the top of the user interface 100. Additionally, term(s) associated with the second custom capital offer can be presented as text element(s) 112. Of note, the content associated with the text element(s) 112 has been updated in the second instance 602 of the user interface 100 to include the terms for the second custom capital offer.

As illustrated in FIG. 6, the first custom capital offer and the second custom capital offer are associated with different loan products. The merchant can determine that the second custom capital offer is associated with a second loan product, for monthly repayment. Several indicators provide visual cues for the merchant. For instance, a text element of the text element(s) 108 that identify the different types of loan products is underlined, indicating that the second custom capital offer is associated with a monthly repayment product. Additionally, the control 104 is positioned in a region of the trackbar 106 that is shaded in a second shading, which is visually distinct from a first shading representative of capital offers associated with the first loan product. Lastly, the term(s), as represented by text element(s) 112, enable the merchant to review the elements of the corresponding loan.

Block 508 illustrates determining whether the first custom capital offer is associated with a same loan product as the second custom capital offer. In some examples, the trackbar can be associated with custom capital offers that are associated with different loan products. In at least one example, the UI to manage capital offerings 216 can compare the loan product associated with the first custom capital offer and the loan product associated with the second custom capital offer to determine whether the capital offers are associated with the same or different loan products.

Based at least in part on determining that the first custom capital offer and the second custom capital offer are associated with a same loan product, the UI to manage capital offerings 216 can replace the one or more first terms with one or more second terms associated with the second custom capital offer via a first transition, as illustrated in block 510. In at least one example, when the merchant moves the control between custom capital offers associated with a same loan product, the UI to manage capital offerings 216 can cause term(s) associated with a new custom capital offer to replace term(s) associated with a previous custom capital offer via a dissolve transition. That is, in the context of FIG. 6, if the first custom capital offer and the second custom capital offer were associated with the same loan product, term(s) associated with the first custom capital offer can appear to dissolve from the user interface 100 such that the term(s) associated with the second custom capital offer can appear via the text element(s) 112.

Based at least in part on determining that the first custom capital offer and the second custom capital offer are associated with different loan products, the UI to manage capital offerings 216 can replace the one or more first terms with one or more second terms associated with the second custom capital offer via a second transition, as illustrated in block 512. In at least one example, when the merchant moves the control between custom capital offers associated with different loan products, the UI to manage capital offerings 216 can cause term(s) associated with a new custom capital offer to replace term(s) associated with a previous custom capital offer via a scroll transition, which in some examples, can be in a same direction as the movement of the control. That is, in the context of FIG. 6, since the first custom capital offer and the second custom capital offer are associated with different loan products, term(s) associated with the first custom capital offer can slide out of view in a same direction as the movement of the control and the term(s) associated with the second custom capital offer can slide into view in the same direction.

Figure 7:
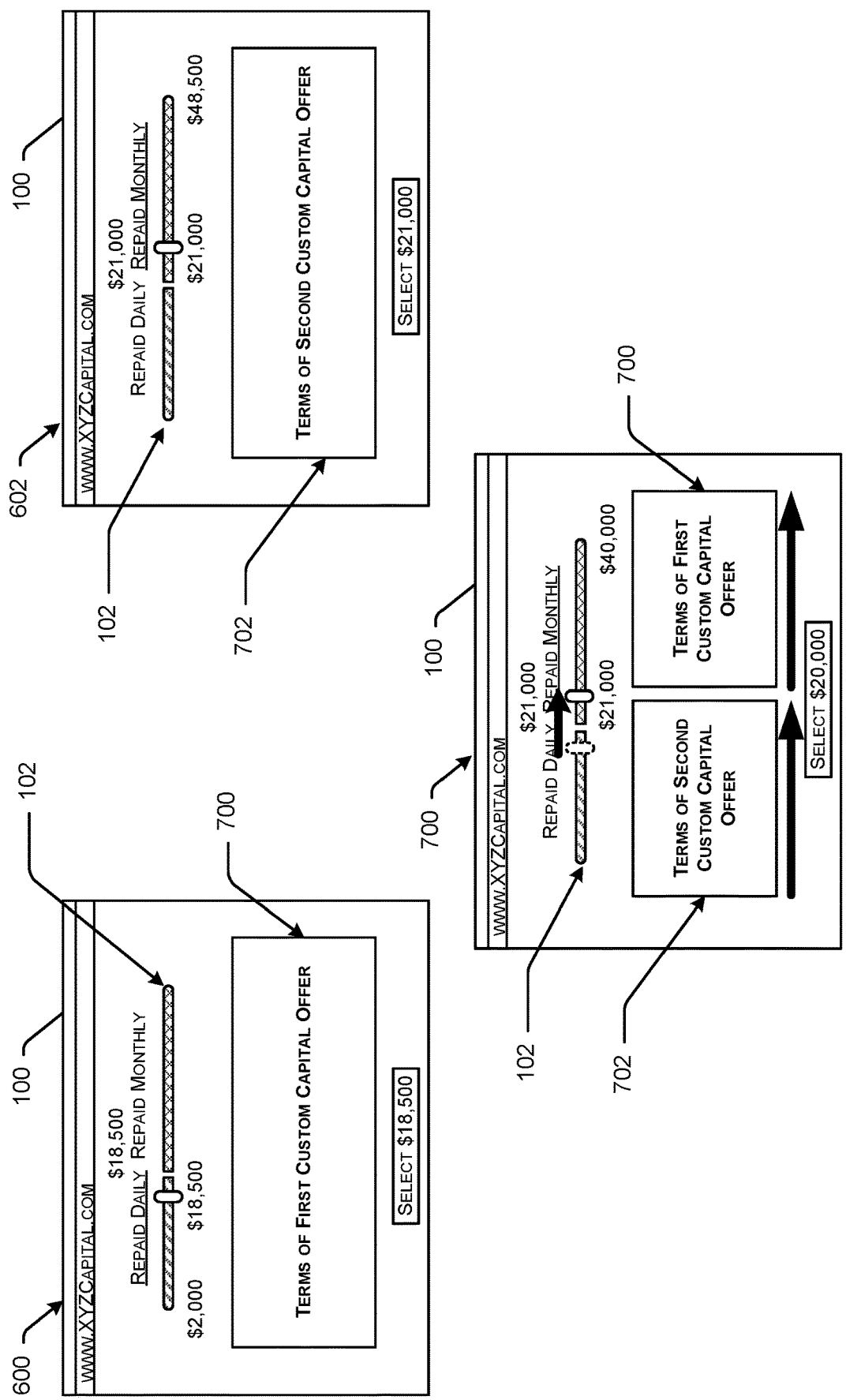
FIG. 7 illustrates updating a user interface that includes a slider to enable potential borrowers to view information associated with different loan products utilizing the slider according to some implementations.

FIG. 7 illustrates updating the user interface 100 via a sliding transition based at least in part on determining that the first custom capital offer and the second custom capital offer are associated with different loan products. Various numerals from FIG. 1 are omitted from FIG. 7 for clarity. As illustrated in FIG. 7, when the merchant moves the control along the length of the trackbar such that the control moves from being proximate to a first custom capital offer associated with a first loan product to being proximate to a second custom capital offer associated with a second loan product, the terms of the first custom capital offer 700 can be replaced with the terms of the second custom capital offer 702 via a sliding transition in same direction of movement as the control. The arrows shown in FIG. 7 illustrate the direction in which the control and the terms can move on the user interface 100. Of course, if the control of the slider moves from right to left along the length of the trackbar, the terms of the new custom capital offer can replace the terms of the previous custom capital offer via a sliding transition that also moves right to left across the display.

As described above, the UI to manage capital offerings 216 can update the user interface 100 in additional and/or alternative ways. For instance, in at least one example, a visual indication associated with text element(s) identifying the different loan products can move from the first loan product to the second loan product. Such differing transitions can provide a visual indicator to the merchant that the loan product has changed.

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computer-implemented method comprising:
    receiving, by a payment processing service and from merchant computing devices associated with merchants, transaction data of transactions performed between the merchants and buyers, the merchant computing devices each executing an instance of a merchant application installed for configuring the merchant computing devices as point-of-sale (POS) terminals, the instances of the merchant application configuring the POS terminals to communicate the transaction data over a network to the payment processing service, the POS terminals including a POS terminal of the POS terminals associated with a merchant of the merchants;
    generating, based on transaction data associated with the first merchant, custom capital offers for the merchant, the custom capital offers associated with a first loan product and a second loan product having different repayment terms than the first loan product, wherein:
    the first loan product is associated with daily repayment terms indicating that a loan associated with an accepted capital offer is to be repaid daily from a portion of transactions processed by a payment processing service on behalf of the merchant;
    the second loan product is associated with monthly repayment terms indicating that a loan associated with an accepted capital offer is to be repaid monthly via a debit from a merchant bank account linked to the payment processing service; and
    the first loan product and the second loan product are offered by the payment processing service;
    determining an indication that the merchant is interested in at least one capital loan product; and
    responsive to determining the indication, presenting, via a display of a device associated with the merchant, a user interface that allows the merchant to (i) transition between the first loan product and the second loan product using a slider and (ii) simultaneously view terms associated with a custom capital offer corresponding to a position of a control of the slider relative to a trackbar of the slider.

2. A computer-implemented method as claim 1 recites, further comprising:
    sending, to an address associated with the merchant, an electronic communication associated with a capital loan product, the electronic communication including a mechanism to cause the user interface to be presented;
    determining an interaction between the merchant and the mechanism; and
    determining the indication based at least in part on the interaction.

3. A computer-implemented method as claim 1 recites, further comprising:
    presenting, via a dashboard associated with the payment processing service and the merchant, a notification associated with a capital loan product, the notification including a mechanism to cause the user interface to be presented;
    determining an interaction between the merchant and the mechanism; and
    determining the indication based at least in part on the interaction.

4. A computer-implemented method as claim 1 recites, further comprising:
    presenting, via a website associated with the payment processing service, a webpage associated with a capital loan product, the webpage including a mechanism to cause the user interface to be presented;
    determining an interaction between the merchant and the mechanism; and determining the indication based at least in part on the interaction.

5. A computer-implemented method as claim 1 recites, further comprising:
determining an acceptance of the custom capital offer;
initiating, by the payment processing service, loan processing associated with the custom capital offer; and
transferring, from a bank account associated with the payment processing service and to the merchant bank account associated with the merchant, funds corresponding to at least a portion of the custom capital offer.

6. A computer-implemented method as claim 1 recites, further comprising, based at least in part on transitioning between the first loan product and the second loan product, replacing one or more first terms associated with the first loan product with one or more second terms associated with the second loan product.

7. A computer-implemented method as claim 1 recites, further comprising, based at least in part on transitioning between the first loan product and the second loan product, updating the user interface to visually distinguish between the first loan product and the second loan product.

8. A system associated with a payment processing service, the system comprising:
one or more processors; and
one or more computer-readable media storing instructions executable by the one or more processors to configure the one or more processors to perform operations including:
receiving, by the payment processing service and from merchant computing devices associated with merchants, transaction data of transactions performed between the merchants and buyers, the merchant computing devices each executing an instance of a merchant application installed for configuring the merchant computing devices as point-of-sale (POS) terminals, the instances of the merchant application configuring the POS terminals to communicate the transaction data over a network to the payment processing service, the POS terminals including a POS terminal of the POS terminals associated with a merchant of the merchants;
generating, based on transaction data associated with the first merchant, custom capital offers for the merchant, the custom capital offers associated with a first loan product and a second loan product having different repayment terms than the first loan product, wherein:
the first loan product is associated with daily repayment terms indicating that a loan associated with an accepted capital offer is to be repaid daily from a portion of transactions processed by a payment processing service on behalf of the merchant;
the second loan product is associated with monthly repayment terms indicating that a loan associated with an accepted capital offer is to be repaid monthly via a debit from a merchant bank account linked to the payment processing service; and
the first loan product and the second loan product are offered by the payment processing service;
determining an indication that the merchant is interested in at least one capital loan product; and
responsive to determining the indication, presenting, via a display of a device associated with the merchant, a user interface that allows the merchant to (i) transition between the first loan product and the second loan product using a slider and (ii) simultaneously view terms associated with a custom capital offer corresponding to a position of a control of the slider relative to a trackbar of the slider.

9. A system as claim 8 recites, the operations further comprising:
sending, to an address associated with the merchant, an electronic communication associated with a capital loan product, the electronic communication including a mechanism to cause the user interface to be presented;
determining an interaction between the merchant and the mechanism; and
determining the indication based at least in part on the interaction.

10. A system as claim 8 recites, the operations further comprising:
presenting, via a dashboard associated with the payment processing service and the merchant, a notification associated with a capital loan product, the notification including a mechanism to cause the user interface to be presented;
determining an interaction between the merchant and the mechanism; and
determining the indication based at least in part on the interaction.

11. A system as claim 8 recites, the operations further comprising:
presenting, via a website associated with the payment processing service, a webpage associated with a capital loan product, the webpage including a mechanism to cause the user interface to be presented;
determining an interaction between the merchant and the mechanism; and
determining the indication based at least in part on the interaction.

12. A system as claim 8 recites, the operations further comprising:
determining an acceptance of the custom capital offer;
initiating, by the payment processing service, loan processing associated with the custom capital offer; and
transferring, from a bank account associated with the payment processing service and to the merchant bank account associated with the merchant, funds corresponding to at least a portion of the custom capital offer.

13. A system as claim 8 recites, the operations further comprising, based at least in part on transitioning between the first loan product and the second loan product, replacing one or more first terms associated with the first loan product with one or more second terms associated with the second loan product.

14. A system as claim 8 recites, the operations further comprising, based at least in part on transitioning between the first loan product and the second loan product, updating the user interface to visually distinguish between the first loan product and the second loan product.

15. One or more non-transitory computer-readable media storing instructions executable by one or more processors of a payment processing service, wherein the instructions program the one or more processors to perform operations comprising:
receiving, by the payment processing service and from merchant computing devices associated with merchants, transaction data of transactions performed between the merchants and buyers, the merchant computing devices each executing an instance of a merchant application installed for configuring the merchant computing devices as point-of-sale (POS) terminals, the instances of the merchant application configuring the POS terminals to communicate the transaction data over a network to the payment processing service, the POS terminals including a POS terminal of the POS terminals associated with a merchant of the merchants;

generating, based on transaction data associated with the first merchant, custom capital offers for the merchant, the custom capital offers associated with a first loan product and a second loan product having different repayment terms than the first loan product, wherein:

the first loan product is associated with daily repayment terms indicating that a loan associated with an accepted capital offer is to be repaid daily from a portion of transactions processed by a payment processing service on behalf of the merchant;

the second loan product is associated with monthly repayment terms indicating that a loan associated with an accepted capital offer is to be repaid monthly via a debit from a merchant bank account linked to the payment processing service; and the first loan product and the second loan product are offered by the payment processing service;

determining an indication that the merchant is interested in at least one capital loan product; and responsive to determining the indication, presenting, via a display of a device associated with the merchant, a user interface that allows the merchant to (i) transition between the first loan product and the second loan product using a slider and (ii) simultaneously view terms associated with a custom capital offer corresponding to a position of a control of the slider relative to a trackbar of the slider.

16. One or more non-transitory computer-readable media as claim 15 recites, the operations further comprising:
sending, to an address associated with the merchant, an electronic communication associated with a capital loan product, the electronic communication including a mechanism to cause the user interface to be presented;
determining an interaction between the merchant and the mechanism; and
determining the indication based at least in part on the interaction.

17. One or more non-transitory computer-readable media as claim 15 recites, the operations further comprising:
presenting, via a dashboard associated with the payment processing service and the merchant, a notification associated with a capital loan product, the notification including a mechanism to cause the user interface to be presented;
determining an interaction between the merchant and the mechanism; and
determining the indication based at least in part on the interaction.

18. One or more non-transitory computer-readable media as claim 15 recites, the operations further comprising:
presenting, via a website associated with the payment processing service, a webpage associated with a capital loan product, the webpage including a mechanism to cause the user interface to be presented;
determining an interaction between the merchant and the mechanism; and
determining the indication based at least in part on the interaction.

19. One or more non-transitory computer-readable media as claim 15 recites, the operations further comprising:
determining an acceptance of the custom capital offer;
initiating, by the payment processing service, loan processing associated with the custom capital offer; and
transferring, from a bank account associated with the payment processing service and to the merchant bank account associated with the merchant, funds corresponding to at least a portion of the custom capital offer.

20. One or more non-transitory computer-readable media as claim 15 recites, the operations further comprising, based at least in part on transitioning between the first loan product and the second loan product, replacing one or more first terms associated with the first loan product with one or more second terms associated with the second loan product.

* * * * *